United States Patent [19]

Natale, Jr.

[11] 4,231,598
[45] Nov. 4, 1980

[54] LATCH ASSEMBLY

[75] Inventor: Anthony J. Natale, Jr., Mentor, Ohio

[73] Assignee: Towmotor Corporation, Mentor, Ohio

[21] Appl. No.: 936,985

[22] Filed: Aug. 25, 1978

[51] Int. Cl.² ............................................. E05C 3/04
[52] U.S. Cl. ...................................... 292/210; 292/54
[58] Field of Search .................. 292/31, 54, 129, 210, 292/108, 229, DIG. 60

[56] References Cited

U.S. PATENT DOCUMENTS

| 896,177 | 8/1908 | Turner | 292/31 |
|---|---|---|---|
| 1,263,358 | 4/1918 | Anderson | 292/229 X |
| 1,393,628 | 10/1921 | Leichter | 292/210 |
| 4,025,094 | 5/1977 | Mitchell | 292/DIG. 60 |
| 4,124,239 | 11/1978 | Horton | 292/210 |

Primary Examiner—Richard E. Moore
Attorney, Agent, or Firm—Phillips, Moore, Weissenberger, Lampio & Majestic

[57] ABSTRACT

A latch assembly (44) comprises a base (48), an arm (80,82) mounted to the base (48) for movement between open and closed positions, and a restraining lever (58) movably mounted to said base. The restraining lever (58) is selectively positionable between a restraining position for restraining the arm (80,82) in the open and closed positions and a release position for releasing the arm (80,82) from the open and closed positions. The restraining lever (58) has a first surface (73,75) for restraining the arm in the closed position with the lever in the restraining position and a second surface (77,79) for restraining the arm in the open position with the lever (58) in the restraining position. Further the latch assembly (44) is disclosed in combination with a compartment (10) which compartment (10) includes a cover (22,24) removably secured thereto. The cover (22,24) includes a tab (26,28), and the arm (80,82) in the closed position extends over the cover (22,24) into engagement with the tab (26,28). The latch assembly (44) prevents displacement of the compartment cover (22,24) relative to the compartment (10).

7 Claims, 4 Drawing Figures

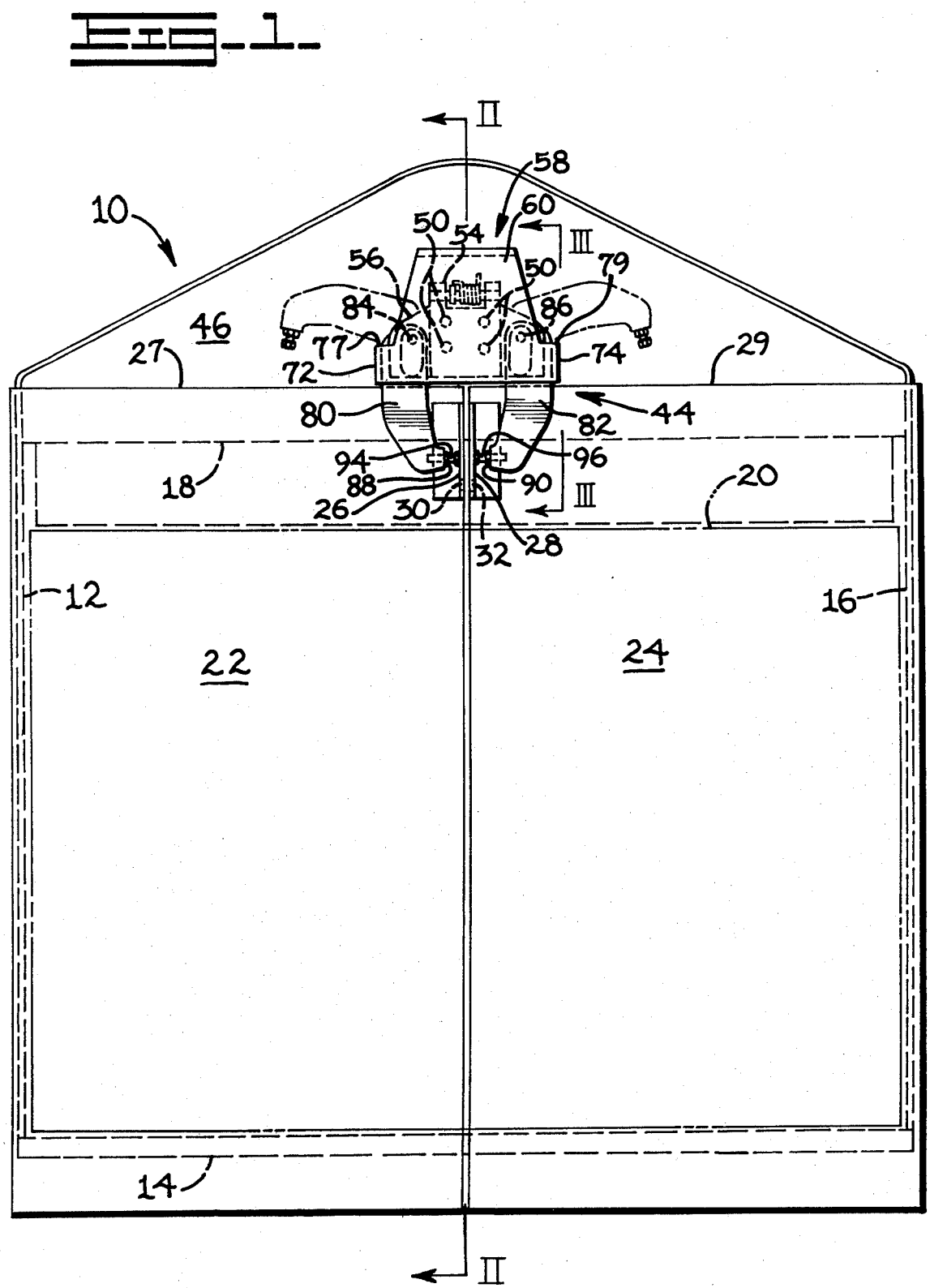

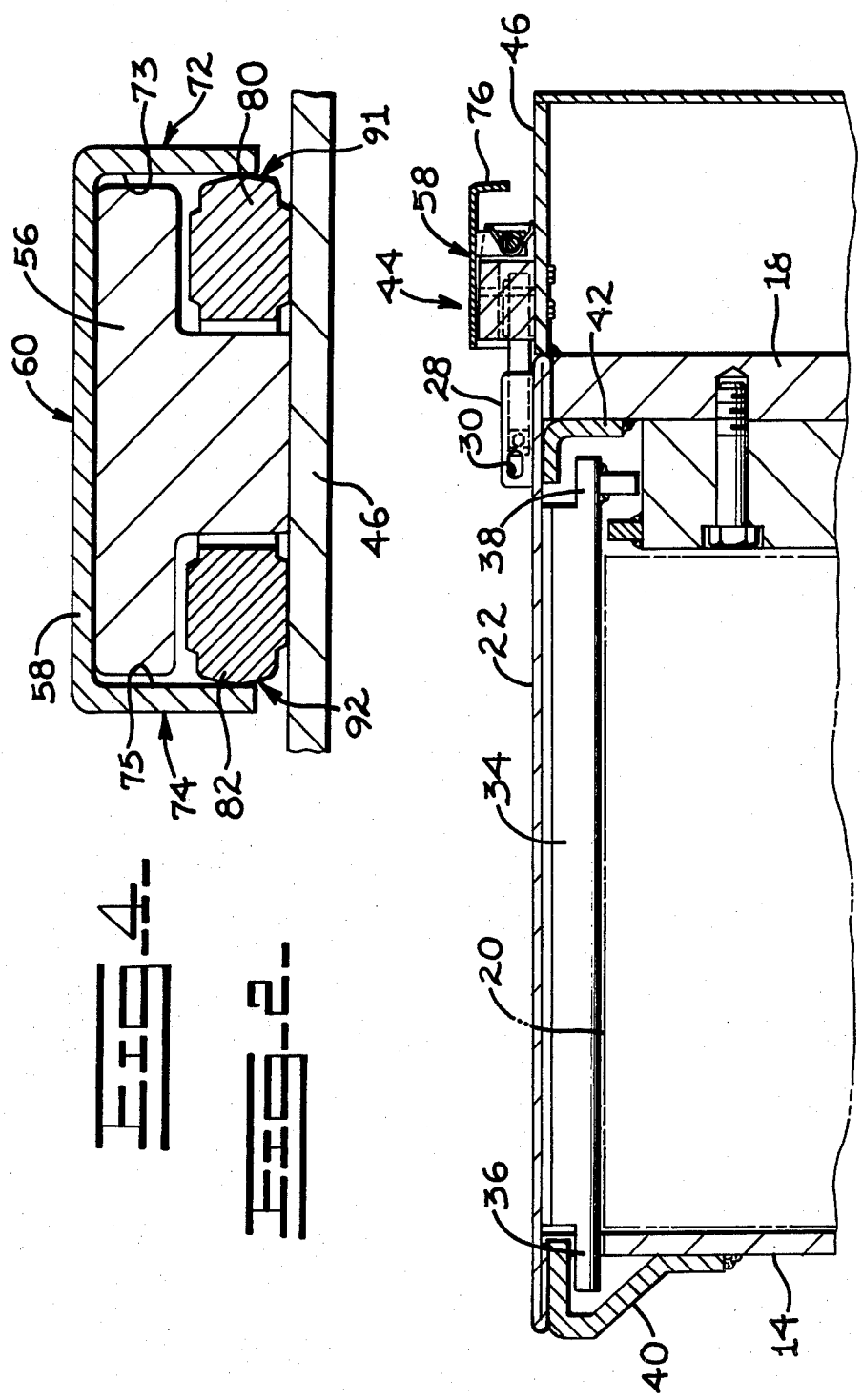

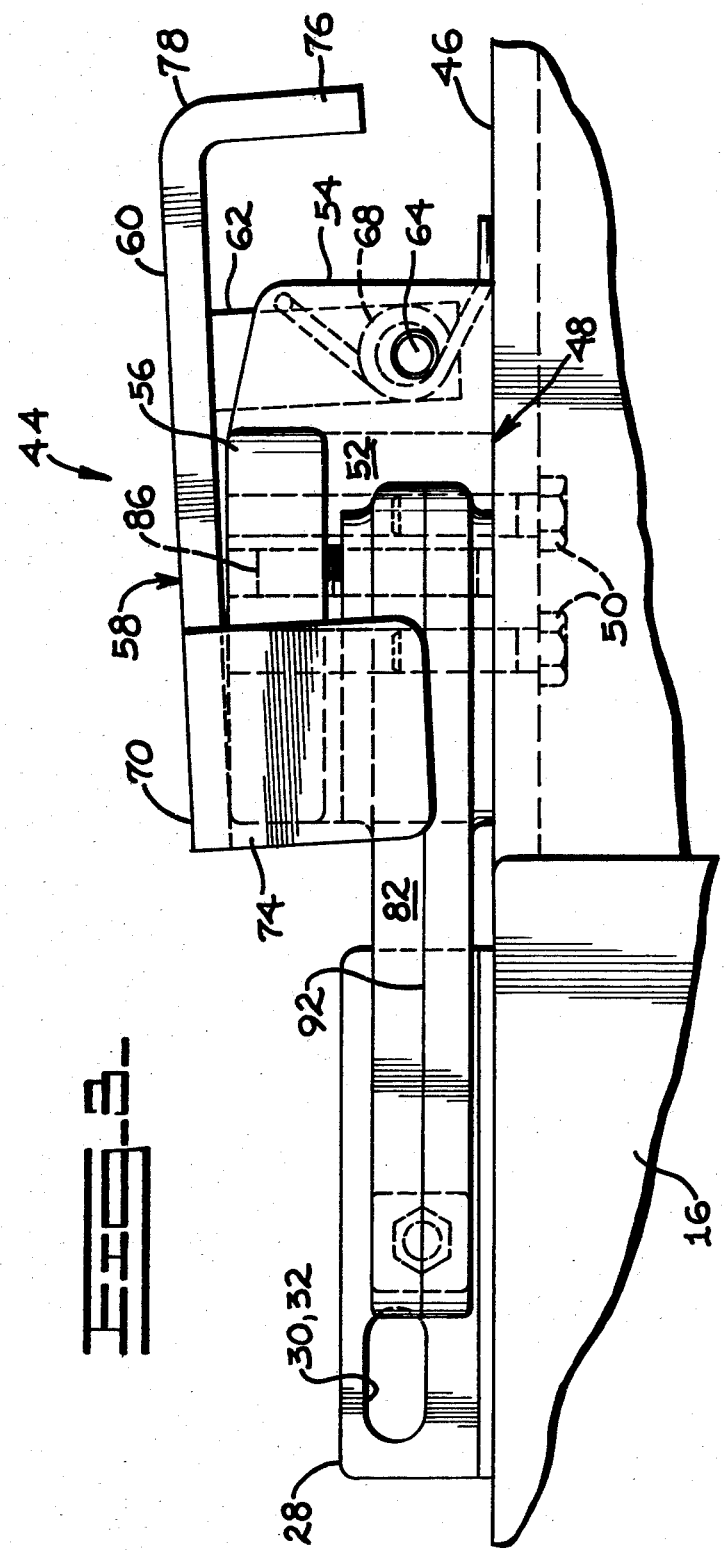

4,231,598

LATCH ASSEMBLY

TECHNICAL FIELD

This invention relates to a latch assembly and more particularly, to a latch assembly for lockingly securing a battery cover member to the battery enclosure of a vehicle.

BACKGROUND ART

In an electrically driven vehicle, as for example in a lift truck or the like, it is well known to provide a battery enclosure to isolate the battery from the environment. Also, there is a need to enhance the ability of prior art battery enclosures to prevent movement of the battery should the vehicle tilt. Yet, it is to be understood that easy and convenient access to said battery must be provided for the maintenance thereof, through selective removal of a battery cover from the battery enclosure.

Prior art devices include locks and latches and other restraints mounted on the battery compartment which can secure the cover of the compartment to the battery enclosure of the compartment. Such devices do not always allow easy and convenient access to the battery.

DISCLOSURE OF THE INVENTION

The present invention is directed to overcoming one or more of the problems set forth above.

In accordance with the present invention, a latch assembly is disclosed which comprises a base, a restraining lever movably mounted to said base, and an arm movably mounted to said base and movable selectively between an open position and a closed position. The restraining lever includes a restraining portion that is selectively positionable to a restraining position to restrain said arm in the open position and in the closed position, and is further positionable in a release position to release said arm from the open and closed positions.

An aspect of the latch assembly includes a first surface provided on the restraining lever for restraining the arm in the closed position with the lever in the restraining position and a second surface provided on the lever for restraining the arm in the open position with the lever in the restraining position.

A further aspect of the latch assembly includes one tapered or angled surface provided on the arm, which surface engages said restraining lever for wedgingly urging said arm to the closed position.

Another aspect of the invention includes the above-disclosed latch assembly in combination with a compartment, which compartment includes a cover removably secured thereto. The arm in the closed position extends over the cover. The cover includes an upstanding tab, and the arm is engagable with said tab with said arm in the closed position. Thus, the arm prevents horizontal and vertical movement of the cover relative to the compartment.

BRIEF DESCRIPTION OF THE DRAWINGS

Other advantages of the invention will become apparent from a study of the following specification and drawings, in which:

FIG. 1 is a plan view of the latch assembly of the invention as mounted on top of the battery compartment of a vehicle;

FIG. 2 is a cross-sectional view taken along line II—II of FIG. 1;

FIG. 3 is an enlarged side elevational view of the latch assembly as viewed in the direction of arrows III—III in FIG. 1; and FIG. 4 is a cross-sectional view taken along line IV—IV in FIG. 3.

BEST MODE FOR CARRYING OUT THE INVENTION

With reference to the figures, and in particular to FIG. 1, there is depicted a battery enclosure for a battery powered vehicle, and in particular a battery powered lift truck, which battery enclosure is generally denoted 10.

Battery enclosure 10 includes upstanding side walls 12 and 16 and front and rear walls 14 and 18. The battery is enclosed therebetween, which battery is depicted by broken line 20 in FIGS. 1 and 2. The battery enclosure includes battery covers 22 and 24, which battery covers are slidable laterally with respect to the side walls 12 and 16, into an adjacent relationship. Battery covers 22 and 24 include upstanding tab members 26 and 28 located adjacent the rear edges 27 and 29 of covers 22 and 24, respectively. Tab members 26 and 28 are positioned adjacent each other with the battery covers 22 and 24 closed together. Tab members 26 and 28 include apertures 30 and 32 (which aperture 32 is directly in line with and hidden behind aperture 30 as depicted in FIGS. 2 and 3) to receive a standard padlock or the like for locking the covers together as required in certain applications.

The battery covers 22 and 24 each include reinforcing stiffeners 34 (FIG. 2) having portions 36 and 38 at opposed ends thereof. Portions 36 and 38 cooperate with elongated bracket 40 secured to the upper edge of upstanding front wall 14 and elongated L-shaped bracket 42 secured to the upper edge of upstanding rear wall 18. Thus, when the battery covers have been slid into place, portions 36 and 38 of reinforcing stiffeners 34 will engage brackets 40 and 42 and be retained relative to upstanding walls 12, 14, 16 and 18.

Turning to the invention, a latch assembly 44 is mounted on a rearwardly extending shelf 46 of battery enclosure 10. As best seen in FIGS. 1 and 3, latch assembly 44 includes a base 48 which is rigidly affixed to shelf 46 by bolts 50. Base 48 includes an upstanding body 52 having a rearwardly extending bifurcated end portion 54, and a head 56 extending substantially horizontally on either side of the upper portion of body 52 and forwardly of end 54.

Latch assembly 44 further includes first and second arms 80 and 82, pivotally mounted at one end thereof about pins 84 and 86. Pins 84 and 86 are disposed generally vertically through bores provided in head 56 on opposite sides of body 52. Thus, arms 80 and 82 can pivot about pins 84 and 86, respectively, in substantially a horizontal plane.

Arms 80 and 82 are generally elongated and extend outwardly from pins 84 and 86, respectively, and then inwardly towards each other. Arms 80 and 82 end in generally parallel end surfaces 88 and 90, respectively. Arms 80 and 82 are pivotal between a spread apart, open position not extending over covers 22 and 24 (as depicted in phantom lines in FIG. 1), and a juxtaposed closed position with end surfaces 88 and 90 located adjacent tabs 26 and 28. Threadingly mounted in the end surfaces 88 and 90 of arms 80 and 82, respectively, are first and second adjusting screws 94 and 96. However, it is to be understood that other adjusting devices can be used, as will become apparent from the operation of the latch assembly discussed below.

The upper portions of the outer surface 91 and 92 of arms 80 and 82 (FIG. 4) are tapered or angled together upwardly. The lower portions of the outer surfaces are tapered or angled together downwardly. In a preferred embodiment, the upper and lower portions have approximately a three-degree taper or angle from the vertical.

A restraining lever 58 is pivotally mounted to base 48. Restraining lever 58 includes a planar, trapezoidally-shaped, and generally horizontally disposed plate 60 and elongated tabs 62 are downwardly dependent from plate 60. Tabs 62 are disposed in the bifurcated end 54 of base 48. A pin 64 is provided through apertures in bifurcated end 54 and tabs 62. A torsion spring 68 is disposed about pin 64. One end of coil spring 68 is wrapped about one of the tabs 62, and the other end is in intimate contact with shelf 46. Restraining lever 58 can pivot about pin 64. The forward portion 70 of plate 60 is biased downwardly by torsion spring 68 into contact with head 56 of base 48 (FIG. 3).

Restraining member 58 further includes first and second flanges 72 and 74, respectively, which are dependent downwardly from the forward portion 70 of plate 60. As can be seen in FIGS. 1, 3 and 4, flanges 72 and 74 extend vertically downwardly past and on either side of head 56. Flanges 72 and 74 include vertical juxtaposed internal surfaces 73 and 75 (FIG. 4). Surfaces 73 and 75 retain the arms in the closed position (FIG. 1). Further flanges 72 and 74 have rear edges 77 and 79 which retain the arms in the open position as shown in phantom in FIG. 1.

Further it is noted that a stop 76 (FIG. 3) is downwardly dependent from the rear edge 78 of restraining lever 58. As lever 58 is pivoted against spring 68, stop 76 moves toward and eventually contacts shelf 46.

Industrial Applicability

The operation of the latch assembly of the invention is as follows.

To allow covers 22 and 24 to be slid together in an adjacent relationship, arms 80 and 82 of latch assembly 44 must be disposed in the open position as shown by the phantom lines in FIG. 1. Thus, arms 80 and 82 do not interfere with tabs 26 and 28, when covers 22 and 24 are slid together. Arms 80 and 82 are held in the open position by the rearward edges of flanges 72 and 74 of lever 58.

Battery covers 22 and 24 are then slid into an adjacent relationship as depicted in FIG. 1. Simultaneously, tabs 26 and 28 are brought into an adjacent relationship with each other and latch assembly 44. In this configuration, apertures 30 and 32 of tabs 26 and 28 are aligned such that, for example, a padlock can be disposed therethrough.

To release arms 80 and 82 from the open position, restraining lever 58 is pivoted about pin 64 by applying pressure downwardly against the rear edge 78 thereof. Consequently, the forward edge portion 70 is pivoted upwardly such that flanges 72 and 74 are pivoted out of a restraining relationship with arms 80 and 82. Arms 80 and 82 are then pivoted by the vehicle operator into the closed position wherein end surfaces 88 and 90 are adjacent tabs 26 and 28. The forward portion 70 of lever 58 is then urged downwardly, cooperatively by tension spring 68 and pressure by the vehicle operator. The vertical surfaces 73 and 75 of flanges 72 and 74 engage the outer tapered surfaces of arm members 80 and 82, wedgingly urging arms 80 and 82 and thus screws 94 and 96 together, with tabs 26 and 28 therebetween. It is to be noted that were the surfaces 73 and 75 of flanges 72 and 74 to slope outwardly from each other (not shown), with the flanges engaging the arms, any jarring or vibrating of the arms could cause a component of force to urge the lever upwardly.

As arms 80 and 82 are wedged together, tabs 26 and 28 and thus battery covers 22 and 24 are further forced together into an abutting, adjacent relationship should the initial sliding together of said covers 22 and 24 have not provided this adjacent butting relationship. As screws 94 and 96 are forced against tabs 26 and 28, screws 94 and 96 place stressing forces on tabs 26 and 28, which stressing forces must be overcome before covers 22 and 24 can be separated. The amount of extension of the screws from the arms can be adjusted by turning the screws.

With arms 80 and 82 in the closed position, arms 80 and 82 extend over battery covers 22 and 24. Thus, not only does latch assembly 44 prevent the lateral separation of battery covers 22 and 24, it also prevents the upward motion of covers 22 and 24 should, for example, the battery powered vehicle undergo a rapid forward tilting, which tilting could cause a heavy battery to rock forward. Portions 36 and 38 of stiffeners 34 and brackets 40 and 42 also aid in the retention of the battery.

To remove the battery 20 from the battery enclosure 10, the padlock, if one is provided through apertures 30 and 32, is removed. Normally the padlock keys are located in a maintenance shop where maintenance can be performed safely away from the work area.

With the vehicle in the maintenance shop and the padlock removed, pressure is applied to the rear edge 78 of lever 58, pivoting flanges 72 and 74 upwardly and releasing arms 80 and 82 from the closed position. The arms 80 and 82 are pivoted rearwardly and then lever 58 is released so that flanges 72 and 74 restrain the arms in the open position. With arms 80 and 82 no longer extending over battery covers 22 and 24, these covers can be slid apart. Following maintenance, the battery covers 22 and 24 can again be lockingly provided over the battery as described earlier in the operation of the invention.

What is claimed is:
1. A latch assembly (44) comprising:
   a base (48);
   an arm (80);
   means (50) for mounting said arm to said base (48), said arm being movable between open and closed positions;
   a restraining lever (58) having a restraining portion (72);
   means (54, 62, 64) for movably mounting said restraining lever (58) to said base (48), said restraining portion being movable between a restraining position and a release position; and
   means (73) forming a first surface (73) on said restraining portion (72) for restraining said arm (80, 82) in the closed position with said restraining lever (58) in the restraining position and means (77) forming a second surface (77) on said restraining portion (72) for restraining said arm (80) in the open position with said restraining lever (58) in the restraining position; and
   wherein said arm (80) includes a means (91) for wedgingly urging said arm (80) into the closed position as said restraining lever (58) moves to the restraining position.

2. The assembly of claim 1 wherein said arm (80) includes a means (94) for selectively adjusting the location of the closed position.

3. The assembly of claim 2 wherein said adjusting means (94) includes a screw (94).

4. The assembly of claim 1 including means (68) for springingly biasing said restraining lever (58) in the restraining position.

5. A latch assembly (44) in combination with a compartment (10) which includes a cover (22) removably secured thereto, wherein said latch assembly (44) includes:

a base (48) mounted to said compartment (10);

an arm (80);

means (50) for mounting said arm (80) to said base (48), said arm (80) being movable between open and closed positions, said arm (80) extending over said cover (22) in the closed position;

a restraining lever (58) having a restraining portion (72);

means (54, 62, 64) for mounting said restraining lever to said base (48), said restraining portion (72) being movable between a restraining position and a release position; and means (73) forming a first surface (73) on said restraining portion (72) for restraining said arm (80) in the closed position with said restraining lever (58) in the restraining position and means (77) forming a second surface (77) on said restraining portion (72) for restraining said arm (80) in the open position with said restraining lever (58) in the restraining position; and wherein said cover (22) includes an upstanding tab (26) and wherein said arm (80) in the closed position engages said tab (26).

6. A latch assembly (44) in combination with a compartment (10) which includes a cover (22) removably secured thereto, wherein said latch assembly (44) includes:

a base (48) mounted to said compartment (10);

an arm (80);

means (50) for mounting said arm (80) to said base (48), said arm (80) being movable between open and closed positions, said arm (80) extending over said cover (22) in the closed position;

a restraining lever (58) having a restraining portion (72);

means (54, 62, 64) for mounting said restraining lever to said base (48), said restraining portion (72) being movable between a restraining position and a release position; and means (73) forming a first surface (73) on said restraining portion (72) for restraining said arm (80) in the closed position with said restraining lever (58) in the restraining position and means (77) forming a second surface (77) on said restraining portion (72) for restraining said arm (80) in the open position with said restraining lever (58) in the restraining position; and wherein said cover (22) includes an upstanding tab (26) and wherein said latch assembly (44) includes an adjustment mechanism (94) mounted on said arm (80), said adjustment mechanism (94) adjustable into contact with the upstanding tab (26) with said arm (80) in the closed position.

7. The apparatus of claim 5 wherein said compartment (10) includes another cover (24) having an upstanding tab (28), wherein said upstanding tab (26) of said cover (22) is positionable adjacent said upstanding tab (28) of said another cover (24); and wherein said tabs (26, 28) include apertures (30, 32) provided therein, said apertures (30, 32) being aligned when said tabs (22, 24) are adjacent.

* * * * *